United States Patent Office 2,724,377
Patented Nov. 22, 1955

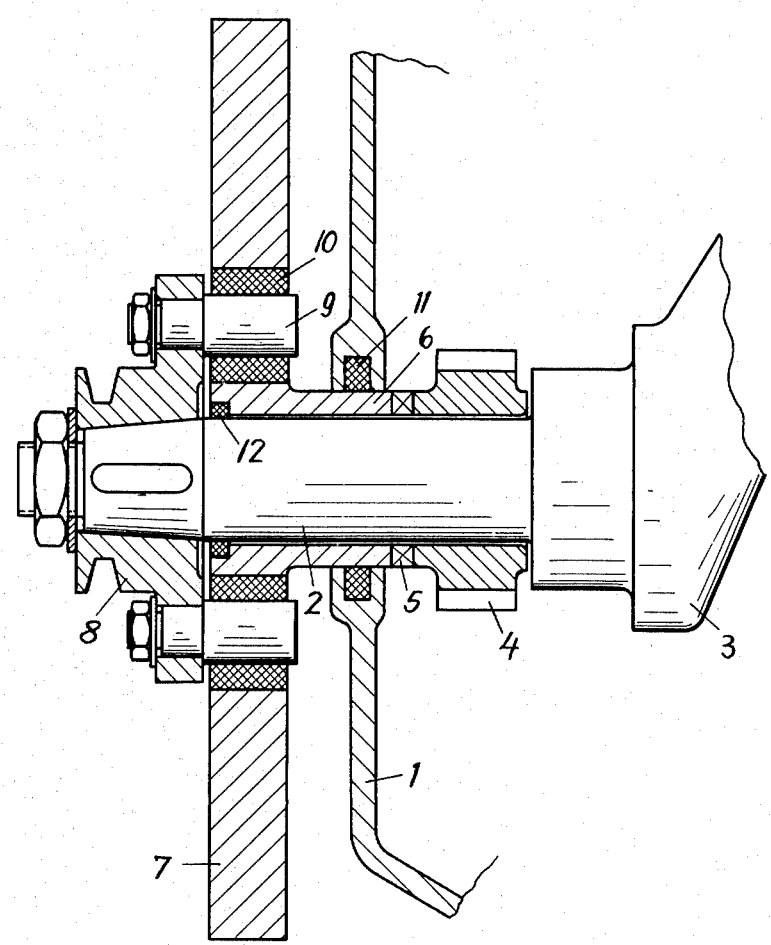

2,724,377

DRIVING DEVICE FOR ACCESSORY SHAFTS

Friedrich K. H. Nallinger, Stuttgart, Germany, assignor to Daimler-Benz Aktiengesellschaft, Stuttgart-Unterturkheim, Germany Application April 22, 1952, Serial No. 283,786

7 Claims. (Cl. 123—195)

Because of speed variations of the crankshaft due to normal cyclic variations of the engine and to vibrations, in many cases either an idler gear is inserted between the crankshaft and the camshaft or another accessory shaft, or the driving gear itself is mounted on a spring basis or comprises yielding elements.

In contradistinction thereto, an object of the present invention is a springy driving device for an accessory shaft, especially the cam shaft of a combustion engine, which is advantageous on account of its simple design, its relatively low cost and light weight.

Another object of this invention is a space saving arrangement of the driving design so that it can be easily accommodated without requiring any enlargement of the engine crankcase.

Another object of this invention is an elastic driving device which is combined with a vibration damping device.

Still another object of this invention is that all parts of the elastic driving device and those of the vibration damper are easily accessible.

Thus a particular characteristic of the invention consists in the fact that, for the elastic coupling between the crankshaft and the accessory shaft, or for the arrangement of the vibration damper the shaft parts have been projected through the wall of the oil pan of the engine to the outside.

Further objects, advantages and characteristics of the present invention will become more obvious from the following description when taken in connection with the accompanying drawing which shows in its single figure for purposes of illustration only one embodiment of the present invention.

A driving gear 4 (sprocket, spur gear, or worm wheel) for the camshaft gear of the engine is slipped, so as to rotate freely, over the projecting end 2 of the crankshaft 3 prolonged through the wall of the crankcase to the outside. The driving gear 4 is coupled in the rotation direction with a carrying member 6 by means of dogs 5, which carrying member in turn is either shaped into a flywheel 7 or is provided with rigid or elastic flywheel masses and is likewise slipped over the protruding end 2 of the crankshaft so that it can rotate freely. For the purpose of transmitting the rotation of the crankshaft, the flywheel is coupled with the latter in the rotation direction by means of a hub 8 fastened at the extremity of the crankshaft and by means of plugs 9 of the hub and rubber sleeves 10. The latter are snugly fitted in drilled holes of the flywheel 7 and may be bonded to the plugs 9 as well as to the flywheel 7 by vulcanization. Instead of using separate rubber sleeves, a continuous rubber ring, the axis of which coincides with that of the crankshaft, can be used as well. In this case, the rubber ring serves as elastic connection between the mass of the flywheel disc 7 and the carrying member 6. Teeth and projections between the rubber ring and the outer mass ring 7 of the flywheel on one side and the carrying member 6 on the other side may insure that the latter is carried along properly in the rotation direction.

The crankcase hole is sealed against the surface of the carrier 6 by means of a packing 11, whereas another packing 12 serves the purpose of an oil seal between the carrier 6 and the crankshaft. The packings, indicated only schematically in the drawing, may be of any kind. The hub 8 may also be given the shape of a V-belt pulley. The masses serving the purpose of vibration damping must not be necessarily made in the form of a flywheel disk or ring; they may be as well divided into individual mass elements and be disposed as pendulum masses kept in place elastically by pins.

My claims are as follows:

1. In a combustion engine having an oil pan, a crankcase, the sides of which enclose the oil pan, a crankshaft, an opening in the side of said crankcase, one end of said crankshaft projecting through said opening, an accessory drive gear inside said crankcase, a further shaft carried through said crankcase opening and actuating said drive gear, packing material for sealing said projecting end of said crankshaft and said further shaft with the wall of said crankcase, a plurality of members elastically yielding in the direction of rotation located outside said crankcase for coupling said projecting end of said crankshaft with said other shaft, a rotating mass outside said crankcase of larger diameter than said opening, said mass being elastically coupled with the projecting end of said crankshaft, on the one hand, and with said further shaft, on the other, whereby said mass serves as a vibration damper between said crankshaft and said further shaft.

2. In an internal combustion engine a crankcase the wall of which encloses an oil pan, a crankshaft, an opening in the wall, the crankshaft being prolonged through the opening in the wall; an accessory drive gear within the crankcase slipped over the crankshaft so as to rotate freely, a hollow shaft carried through the opening of the wall slipped over the prolonged end of the crankshaft so as to rotate freely thereon and in driving connection with the driving gear, packing material for sealing the prolonged crankshaft and the hollow shaft against the crankcase wall; a disc fastened to the extremity of the prolonged crankshaft, an elastic ring connecting the disc with the hollow shaft, and a further ring of considerable weight and of larger diametric dimension than said opening surrounding said elastic ring and adapted to serve as a vibration damper between said crankshaft and said accessory device.

3. A combination according to claim 2, wherein the elastic ring faces the disc in the same axial direction, with holes extending in axial direction in the elastic ring, and plugs of the disc likewise in axial direction fitting into said holes.

4. In an internal combustion engine the combination according to claim 1, wherein said packing material consists of a packing between said further shaft and the projecting end of said crankshaft, on the one hand, and of a packing between said further shaft and the wall of the crankcase, on the other.

5. The combination according to claim 1 wherein said drive gear is of larger diametric dimension than said opening, and further including means for detachably coupling said hollow shaft with said drive gear.

6. In a combustion engine having an oil pan, a crankcase the sides of which enclose said oil pan, a crankshaft, an opening in the side of said crankcase, one end of said crankshaft projecting through said opening, an accessory drive gear inside said crankcase, a further shaft extending through said crankcase opening and actuating said drive gear, a rotating mass outside said crankcase, and elastic means elastically yielding in the direction of rotation and fastened within said rotating mass, said elastic means being firmly connected with said crankshaft, on the one hand, and with said further shaft, on the other.

7. In a combustion engine having an oil pan, a crankcase the sides of which enclose said oil pan, a crankshaft, an opening in the side of said crankcase, one end of said crankshaft projecting through said opening, an accessory drive gear inside said crankcase, a further shaft extending through said crankcase opening and actuating said drive gear, packing material for sealing the projecting end of said crankshaft and said further shaft with the wall of said crankcase, and elastic means elastically yielding in the direction of rotation and fastened within said rotating mass, said elastic means being firmly connected with said crankshaft on the one hand, and with said further shaft, on the other.

References Cited in the file of this patent

UNITED STATES PATENTS

| | | |
|---|---|---|
| 1,635,855 | Moorhouse | July 12, 1927 |
| 1,760,492 | Hall | May 27, 1930 |
| 1,861,390 | Gunn | May 31, 1932 |
| 1,871,480 | Tibbetts | Aug. 16, 1932 |
| 1,910,179 | Pfannenstiehl | May 23, 1933 |
| 2,035,096 | Schneider | Mar. 24, 1936 |
| 2,154,385 | Riesing | Apr. 11, 1939 |
| 2,226,596 | Swenson | Dec. 31, 1940 |

FOREIGN PATENTS

| | | |
|---|---|---|
| 171,295 | Great Britain | Nov. 17, 1921 |
| 445,920 | Great Britain | Apr. 21, 1936 |